US012428257B2

(12) United States Patent
Liu et al.

(10) Patent No.: US 12,428,257 B2
(45) Date of Patent: Sep. 30, 2025

(54) ADJUSTABLE STRAND THREADING AND LUBRICATING DEVICE FOR PREFABRICATED BOX GIRDERS

(71) Applicant: Yantai University, Yantai (CN)

(72) Inventors: Bo Liu, Yantai (CN); Ruixi Yuan, Yantai (CN); Peizhi Gong, Yantai (CN); Zhenyang Huang, Yantai (CN); Chunfei Zhang, Yantai (CN); Shaohua Lai, Yantai (CN); Jinlong Fu, Yantai (CN)

(73) Assignee: Yantai University, Yantai (CN)

( * ) Notice: Subject to any disclaimer, the term of this patent is extended or adjusted under 35 U.S.C. 154(b) by 233 days.

(21) Appl. No.: 18/236,347

(22) Filed: Aug. 21, 2023

(65) Prior Publication Data

US 2024/0190680 A1    Jun. 13, 2024

(30) Foreign Application Priority Data

Dec. 13, 2022  (CN) .......................... 202211603436.0

(51) Int. Cl.
  *B65H 51/08* (2006.01)
  *B65H 51/015* (2006.01)
  *B65H 71/00* (2006.01)

(52) U.S. Cl.
  CPC ............. *B65H 51/08* (2013.01); *B65H 71/00* (2013.01); *B65H 51/015* (2013.01)

(58) Field of Classification Search
  CPC ....... B65H 51/08; B65H 71/00; B65H 51/015
  USPC .............................................. 221/91; 226/91
  See application file for complete search history.

(56) References Cited

U.S. PATENT DOCUMENTS

| | | | | |
|---|---|---|---|---|
| 1,809,492 A | * | 6/1931 | Carlyle ..................... | B60L 5/18 |
| | | | | 191/55 |
| 2,604,650 A | * | 7/1952 | Mottelson ............. | D06F 53/005 |
| | | | | 15/220.4 |
| 3,783,972 A | * | 1/1974 | Molstad ................... | D07B 7/12 |
| | | | | 118/307 |
| 3,791,131 A | * | 2/1974 | Scott .................... | D07B 1/0673 |
| | | | | 57/58.52 |

(Continued)

FOREIGN PATENT DOCUMENTS

| | | | | | |
|---|---|---|---|---|---|
| CN | 211522888 U | * | 9/2020 | ............. | B65H 51/08 |
| CN | 112388820 A | * | 2/2021 | ........... | B28B 23/022 |

(Continued)

*Primary Examiner* — Rakesh Kumar
(74) *Attorney, Agent, or Firm* — Kory D. Christensen

(57) ABSTRACT

An adjustable strand threading and lubricating device for prefabricated box girders includes an underframe. Multiple first spline shafts are rotatably installed between left and right side walls of the strand threading boxes. The first openings are respectively located above the first spline shafts, first sliding blocks are respectively provided and configured to slide up and down in the first openings, multiple second spline shafts is rotatably installed between two first sliding blocks, and axes of the second spline shafts are parallel to the first spline shafts. The first spline shafts and the second spline shafts are slidably provided with multiple strand threading units for threading steel strands, a lubricating unit is arranged on a front side of the strand threading units, and a bundling unit is arranged on a rear side of the strand threading units.

7 Claims, 8 Drawing Sheets

(56) References Cited

U.S. PATENT DOCUMENTS

| | | | | | |
|---|---|---|---|---|---|
| 3,931,920 | A | * | 1/1976 | Hellinger | G03B 1/56 |
| | | | | | 226/110 |
| 4,416,196 | A | * | 11/1983 | Yamada | B65B 27/08 |
| | | | | | 100/153 |
| 4,648,146 | A | * | 3/1987 | Nutzel | E01D 19/14 |
| | | | | | 52/223.13 |
| 4,749,059 | A | * | 6/1988 | Jonnes | F16N 7/12 |
| | | | | | 118/DIG. 18 |
| 4,891,037 | A | * | 1/1990 | Maples | F16G 13/02 |
| | | | | | 184/15.1 |
| 4,900,193 | A | * | 2/1990 | MacKinnon | E02D 5/523 |
| | | | | | 52/223.13 |
| 5,022,493 | A | * | 6/1991 | Buckelew | A47L 25/00 |
| | | | | | 15/210.1 |
| 5,067,590 | A | * | 11/1991 | King, Sr. | B65G 45/02 |
| | | | | | 141/2 |
| 7,097,877 | B2 | * | 8/2006 | Brown | B60C 17/10 |
| | | | | | 427/236 |
| 2006/0173405 | A1 | * | 8/2006 | Haithcock | A61M 25/0111 |
| | | | | | 604/37 |
| 2016/0221789 | A1 | * | 8/2016 | Börger | B65H 57/16 |
| 2021/0071803 | A1 | * | 3/2021 | Warren | G01N 21/954 |

FOREIGN PATENT DOCUMENTS

| | | | | | |
|---|---|---|---|---|---|
| CN | 215947911 | U | * | 3/2022 | B65H 51/08 |
| CN | 216997107 | U | * | 7/2022 | B65H 51/08 |
| CN | 115196417 | A | * | 10/2022 | B65H 51/08 |

\* cited by examiner ical Field

The present disclosure relates to field of buildings, in particular to an adjustable strand threading and lubricating device for prefabricated box girders.

BACKGROUND

Prefabricated concrete box girders are common in bridge construction. By pouring in advance and then assembling the concrete box girders, the construction time for the bridge can be greatly saved.

When box girders are prefabricated, it is necessary to use inner and outer molds, reinforcing cages are bound and then poured between the molds. In order to ensure the strength, multiple corrugated pipes need to be laid in the reinforcing cages of webs on both sides, and the corrugated pipes and the webs are poured together. After pouring, steel strands are inserted into the corrugated pipes, then prestress tension is carried out on the steel strands, and finally grouting is carried out in the corrugated pipes, so that the corrugated pipes and steel strands are integrated. Before the box girders are poured, in order to prevent the corrugated pipes and holes from being blocked by concrete slurry, plastic pipes or other media should be inserted into the corrugated pipes and holes, and plastic pipes should be drawn back and forth during pouring. After pouring is completed, the plastic pipes should be pulled out in time to avoid the plastic pipes from being welded fixedly in the corrugated pipes.

In the prior art, the plastic pipes are drawn manually; and a large number of holes are presented in the box girders, so it is difficult to pull the plastic pipes at the same time when the number of workers is insufficient, so that the plastic pipes are easily welded fixedly in the corrugated pipes. Moreover, the steel strands are threaded one by one, so that the efficiency is low; and the insides of the corrugated pipes are also easy to scratch.

There is an urgent need for a strand threading device which can transport both plastic pipes and steel strands.

SUMMARY

The present disclosure aims to provide an adjustable strand threading and lubricating device for prefabricated box girders.

The purpose of the present disclosure is achieved through the following technical solutions. An adjustable strand threading and lubricating device for prefabricated box girders includes an underframe. Wheels are installed on the underframe, multiple strand threading boxes are fixedly connected on a top surface of the underframe from bottom to top in a sequentially stacked manner, a feeding side of the strand threading boxes is a rear side, a discharging side of the strand threading boxes is a front side, multiple first spline shafts are rotatably installed between left and right side walls of the strand threading boxes, axes of the first spline shafts are vertical to the left and right side walls of the strand threading boxes, first openings are formed in the left and right side walls of the strand threading boxes, the first openings are respectively located above the first spline shafts, first sliding blocks are respectively provided and configured to slide up and down in the first openings, multiple second spline shafts are rotatably installed between two first sliding blocks, and axes of the second spline shafts are parallel to the first spline shafts.

The first spline shafts and the second spline shafts are provided with multiple strand threading units for threading steel strands which are slidable along the directions of the axes of the first spline shafts and the second spline shafts, a lubricating unit is arranged on a front side of the strand threading units, and a bundling unit is arranged on a rear side of the strand threading units.

Preferably, each of the strand threading units includes a first box body, a top surface of the first box body is open, second openings are formed in left and right side walls of the first box body, bearings are installed at the second openings, multiple first rubber rollers are rotatably installed between two bearings, the first spline shafts pass respectively through the second openings to stretch into the first box body, the first rubber rollers respectively slidably sleeve the first spline shafts, first spline grooves matched with the first spline shafts are formed in the first rubber rollers, first ring grooves are formed in circumferential outer walls of the first rubber rollers, and multiple first anti-skid stripes are uniformly and fixedly connected into the first ring grooves around the axes of the first spline shafts.

Front and rear sides of the top surface of the first box body are fixedly connected with vertical plates, first sliding chutes are formed in opposite sides of two vertical plates, a length direction of the first sliding chutes is vertical to ground, a second box body is slidably located in the first sliding chutes and located above the first box body, a bottom surface of the second box body is open, third openings are formed in left and right side walls of the second box body, bearings are fixedly connected at the third openings, multiple second rubber rollers are rotatably installed between two bearings, the second spline shafts pass respectively through the third openings to stretch into the second box body, the second rubber rollers respectively slidably sleeve the second spline shafts, second spline grooves matched with the second spline shafts are formed in the second rubber rollers, second ring grooves are formed in circumferential outer walls of the second rubber rollers, and multiple second anti-skid stripes are uniformly and fixedly connected into the second ring grooves around the axes of the second spline shafts.

A first avoidance groove is formed in a front side wall of each of the strand threading boxes, a second avoidance groove is formed in a rear side wall of each of the strand threading boxes, a feeding pipe is fixedly connected to a rear side wall of the first box body, an end of the feeding pipe is communicated into the first box body, an other end of the feeding pipe extends out of the second avoidance groove, and is provided with the bundling unit, a discharging pipe is fixedly connected to a front side wall of the first box body, an end of the discharging pipe is communicated into the first box body, an other end of the discharging pipe extends towards the first avoidance groove, and is provided with the lubricating unit.

Preferably, the bundling unit includes a first disc, the first disc rotatably sleeves a circumferential outer wall of an end of the feeding pipe, the first disc is coaxial with the feeding pipe; an end face, facing the strand threading boxes, of the first disc is fixedly connected with a first gear ring, the first gear ring is coaxial with the first disc, a first motor is installed on a circumferential outer wall of the feeding pipe, an output shaft of the first motor is fixedly connected with a first gear, and the first gear is meshed with the first gear ring.

An end face, away from the strand threading boxes, of the first disc is fixedly connected with a wire roller, the wire roller is located at an eccentric position of the first disc, and an axis of the wire roller is parallel to an axis of the first disc.

Preferably, a top surface of an uppermost one of the strand threading boxes is fixedly connected with a top oil tank, a bottom surface of a lowermost one of the strand threading boxes is fixedly connected with a recovery tank, the top oil tank communicates with the recovery tank through an oil pipe, a pump body is installed on the oil pipe, and water leakage holes communicating with adjacent strand threading boxes are formed in a bottom surface of the top oil tank and a top surface of the recovery tank.

A second sliding chute is formed in an inner bottom surface of each of the strand threading boxes, the second sliding chute is located below the discharging pipe, a sliding direction of the second sliding chute is parallel to a shaft axis of the discharging pipe, first water leakage holes communicating with a lower one of the strand threading boxes are formed in a bottom surface of the second sliding chute, a first sliding plate which is able to block the first water leakage holes is slidably arranged in the second sliding chute, second water leakage holes matched with the first water leakage holes are formed in the first sliding plate, a spring is installed in the second sliding chute, one end of the spring is fixedly connected with a rear side wall of the second sliding chute, an other end of the spring is fixedly connected with a rear side wall of the first sliding plate, and a guide inclined plane is arranged in a front side of the first sliding plate.

Preferably, the lubricating unit includes a first square frame, the first square frame is located above the second sliding chute, an opening direction of the first square frame is vertical to a bottom surface of the strand threading boxes, the first square frame is fixedly connected to a front end of the discharging pipe; one end, facing the discharging pipe, of the first square frame communicates with the discharging pipe, and an other end, facing the first avoidance groove, of the first square frame is fixedly connected with an end of a second pipeline; an other end of the second pipeline extends out of the first avoidance groove, a notch is formed on a circumferential outer wall, facing a top surface of the strand threading boxes, of the discharging pipe, and third water leakage holes are formed on a circumferential outer wall, facing a bottom surface of the strand threading boxes, of the discharging pipe.

A first square column is arranged in the first square frame in an up and down slidable manner, a driving inclined plane matched with the guide inclined plane is arranged on a rear side wall of the first square column, a first channel and a second channel are sequentially formed between a front side wall and the rear side wall of the first square column from bottom to top, the first channel and the second channel are both parallel to the axis of the discharging pipe and are able to communicate with the discharging pipe and the second pipeline; a storage tank is formed in a top portion of the first square column, multiple rub caps are stacked in the storage tank, a bottom of the storage tank communicates with the second channel, the rear side wall of the first square column is also fixedly connected with a lifting block, the lifting block slidably sleeves a first cross rod, an axis of the first cross rod is perpendicular to the left and right side walls of the strand threading boxes, and both ends of the first cross rod extend respectively out of the left and right side walls of the strand threading boxes.

Preferably, a first threaded rod and a first sliding rod are rotatably installed on the underframe, axes of the first threaded rod and the first sliding rod are vertical to the ground, the first threaded rod and the first sliding rod are respectively located on the left and right sides of the strand threading boxes, one end of the first cross rod sleeves the first sliding rod, an other end of the first cross rod sleeves the first threaded rod and is in threaded connection with the first threaded rod, and a second motor for driving the first threaded rod to rotate is also installed on the underframe.

Preferably, a third motor is installed on an outer side wall of each of the strand threading boxes, an output shaft of the third motor extends into the strand threading box and is fixedly connected with one of the first spline shafts, and belts are arranged between the other first spline shafts to drive the other first spline shafts.

A fourth motor is installed on each of the first sliding blocks, an output shaft of the fourth motor extends into the strand threading box and is fixedly connected with one of the second spline shafts, belts are arranged between the other second spline shafts to drive the other second spline shafts, an electric telescopic rod is also installed on the outer side wall of the strand threading box, a telescopic end of the electric telescopic rod is vertical to the ground and fixedly connected with the first sliding blocks.

Preferably, the underframe is formed by welding multiple steel angles.

By the adopting the technical solutions, some embodiments have the following advantages.

Firstly, during strand threading construction of the box girders, plastic pipes and steel strands can be threaded in batches, and the steel strands are bundled when being threaded, so that multiple steel strands can be threaded at one time, and the efficiency is improved. The steel strands and the plastic pipes can be lubricated to avoid being stuck when being threaded.

Secondly, the position of the first box body can be adjusted left and right to correspond to the holes at different positions in the box girders, so as to facilitate the threading of steel strands and plastic pipes. The position of the second box body can be adjusted up and down to correspond to plastic pipes and steel strands with different diameters. Reciprocating of the plastic pipes can also be carried out.

Thirdly, when the first square column is located at the upper position, the first channel communicates with the discharging pipe and the second pipeline at both ends for transporting the plastic pipes. When the first square column is located at the lower position, the second channel communicates with the discharging pipe and the second pipeline at both ends for transporting the steel strands. At the same time, the first square column drives the second water leakage holes to be aligned with the first water leakage holes, lubricating oil drops to the lower layer on the steel strands to lubricate the steel strands. Rubber caps are also placed in the second channel, and can prevent the ends of the steel strands from cutting the corrugated pipes during transportation. Different categories of plastic pipes and steel strands can be transported, and the transportation effect is good.

Other advantages, objects and features of the present disclosure are set forth in the following specification to some extent, and are apparent to those skilled in the art to some extent based on the following investigation, or may teach

BRIEF DESCRIPTION OF THE DRAWINGS

The attached figures of the present disclosure are described below.

Reference signs: 1 underframe; 2 wheel; 3 strand threading box; 4 first spline shaft; 5 first opening; 6 first sliding block; 7 second spline shaft; 8 first box body; 9 second opening; 10 first rubber roller; 11 first spline groove; 12 first ring groove; 13 first anti-skid stripe; 14 vertical plate; 15 first sliding chute; 16 second box body; 17 third opening; 18 second rubber roller; 19 second spline groove; 20 second ring groove; 21 second anti-skid stripe; 22 first avoidance groove; 23 second avoidance groove; 24 feeding pipe; 25 discharging pipe; 26 first disc; 27 first gear ring; 28 first motor; 29 first gear; 31 wire roller; 32 top oil tank; 33 recovery tank; 34 oil pipe; 35 pump body; 36 second sliding chute; 37 first water leakage hole; 38 first sliding plate; 39 second water leakage hole; 40 spring; 41 guide inclined plane; 42 first square frame; 43 second pipeline; 44 notch; 45 third water leakage hole; 46 first square column; 47 driving inclined plane; 48 first channel; 49 second channel; 50 storage tank; 51 rubber cap; 52 lifting block; 53 first cross rod; 54 first threaded rod; 55 first sliding rod; 56 second motor; 57 third motor; 58 fourth motor; and 59 electric telescopic rod.

DETAILED DESCRIPTION OF THE EMBODIMENTS

The present disclosure is further described in conjunction with the attached figures and embodiments.

In the description of the present disclosure, it needs to be illustrated that the indicative direction or position relations of the terms such as "center", "longitudinal", "transverse", "upper", "lower", "front", "rear", "left", "right", "vertical", "horizontal", "top", "bottom", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first", "second" and "third" are just used for distinguishing the description, but cannot be understood to indicate or hint relative importance. In the description of the embodiment in the present disclosure, it needs to be illustrated that, except as otherwise noted, the terms such as "link" and "connect" should be generally understood. For example, the components can be fixedly connected, and also can be detachably connected or integrally connected; the components can be mechanically connected, and also can be electrically connected; and the components can be directly connected, and also can be indirectly connected through an intermediate. For those skilled in the art, the specific meanings of the terms in the present disclosure can be understood according to specific conditions.

Figure 1:
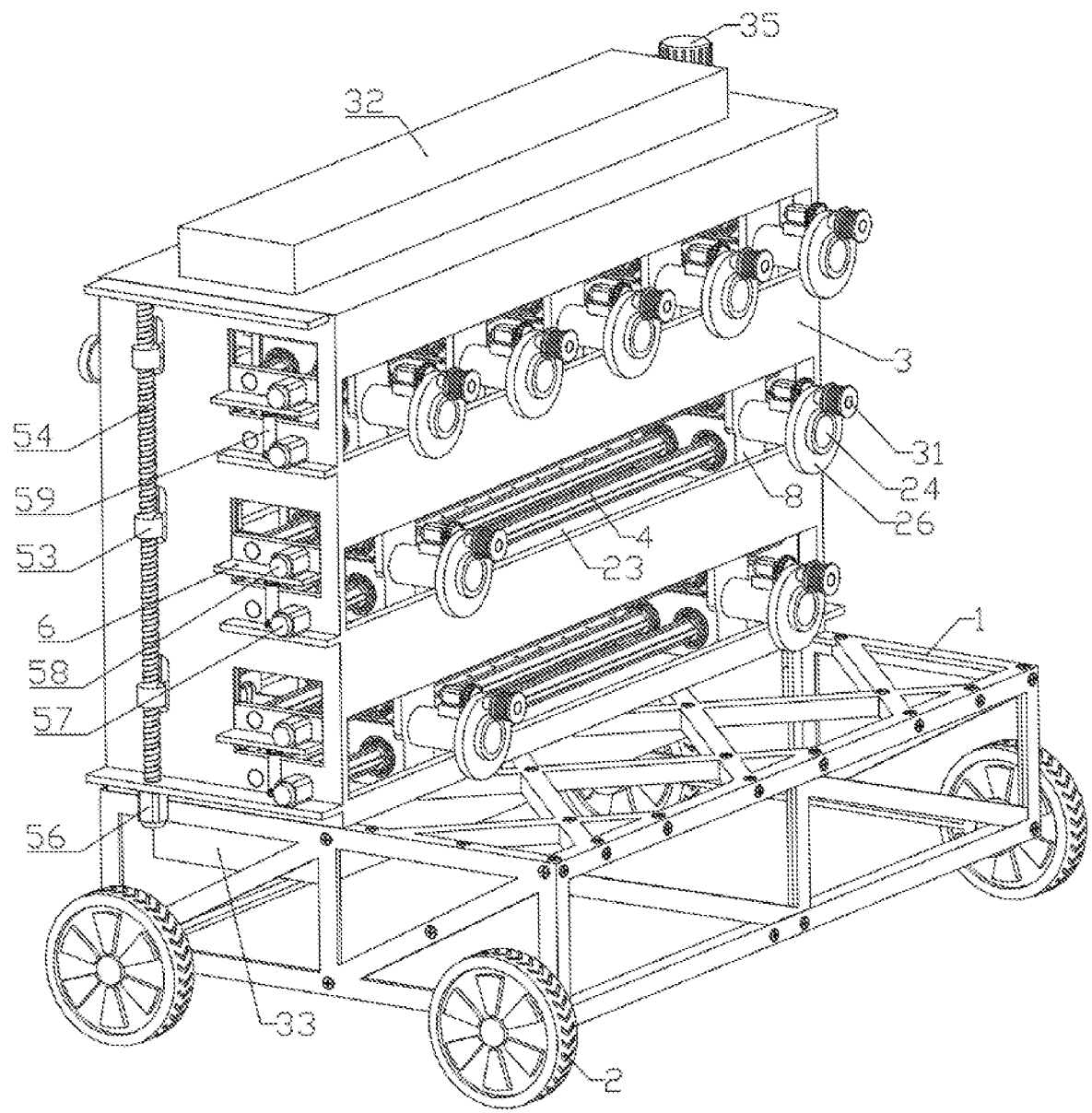
FIG. 1 is an overall schematic diagram of an adjustable strand threading and lubricating device for prefabricated box girders in the present disclosure.
Figure 2:
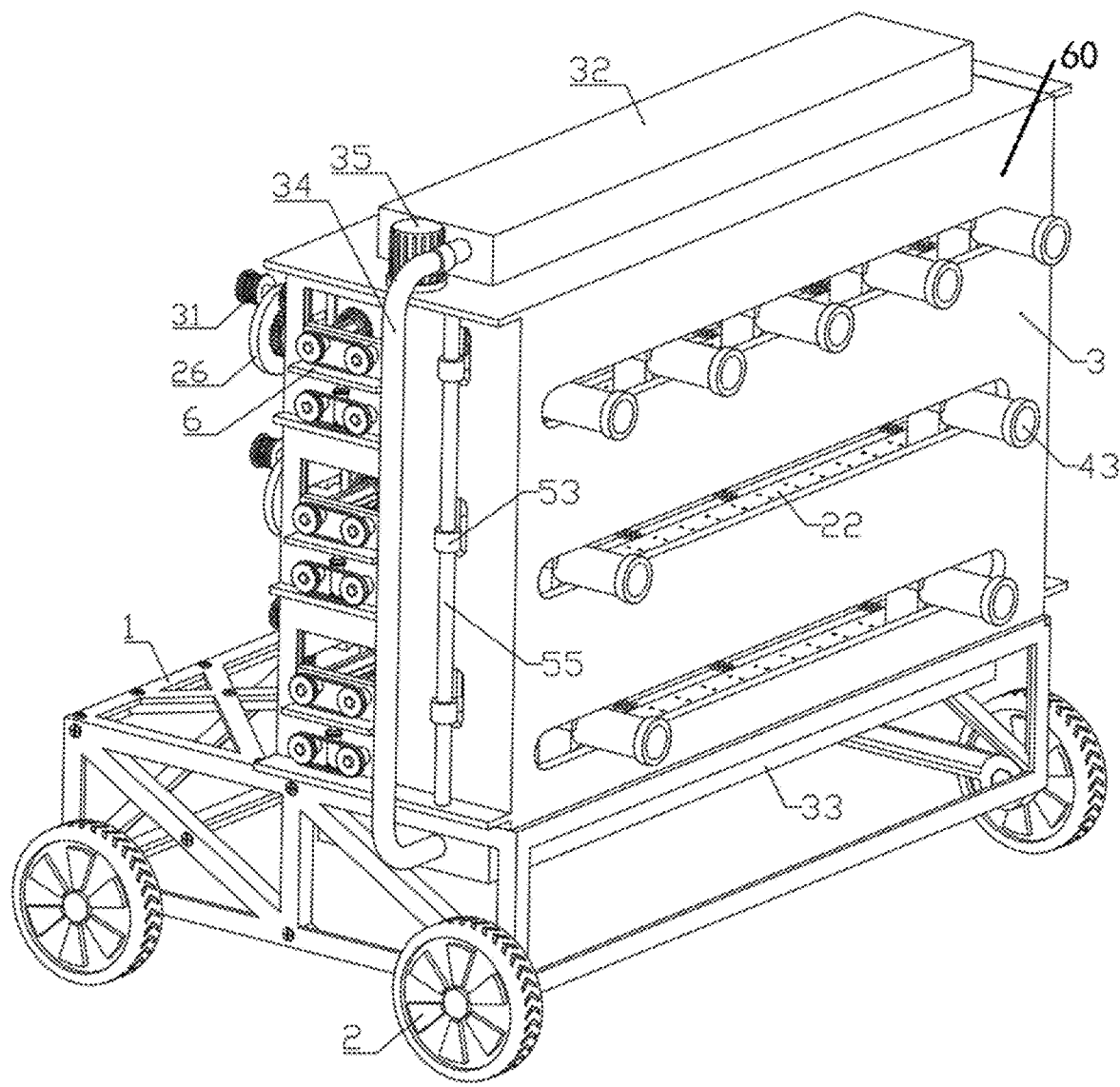
FIG. 2 is a schematic diagram of a top oil tank in the present disclosure.
Figure 5:
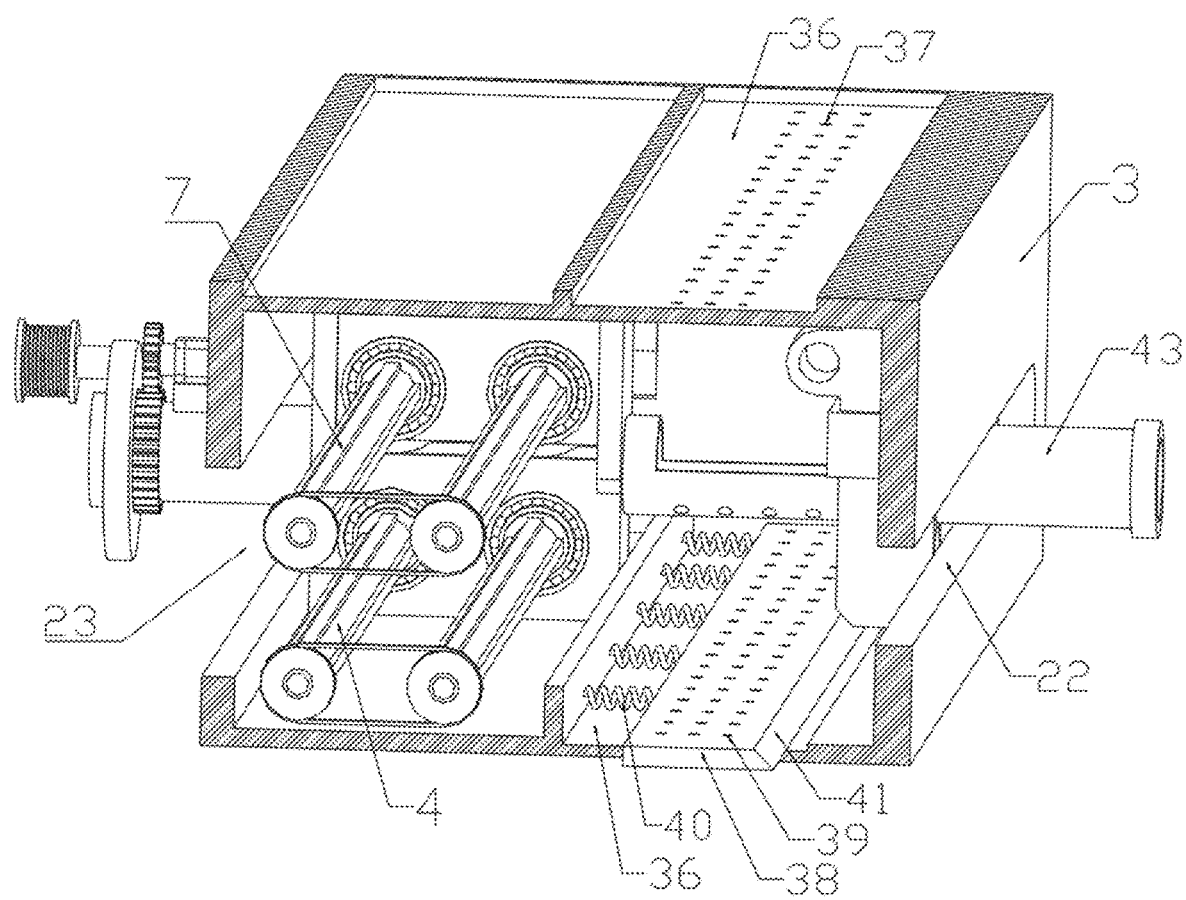
FIG. 5 is a section view of a strand threading box in the present disclosure.

As shown in FIG. 1. FIG. 2 and FIG. 5, an adjustable strand threading and lubricating device for prefabricated box girders, including an underframe 1, where wheels 2 are installed on the underframe 1, multiple strand threading boxes 3 are fixedly connected on a top surface of the underframe 1 from bottom to top in a sequentially stacked manner, a feeding side of the strand threading boxes 3 is a rear side, a discharging side of the strand threading boxes 3 is a front side, multiple first spline shafts 4 are rotatably installed between left and right side walls of the strand threading boxes 3, axes of the first spline shafts 4 are vertical to the left and right side walls of the strand threading boxes 3, first openings 5 are formed in the left and right side walls of the strand threading boxes 3, the first openings 5 are respectively located above the first spline shafts 4, first sliding blocks 6 are respectively provided and configured to slide up and down in the first openings 5, multiple second spline shafts 7 are rotatably installed between two first sliding blocks 6, and axes of the second spline shafts 7 are parallel to the first spline shafts 4.

The first spline shafts 4 and the second spline shafts 7 are provided with multiple strand threading units for threading steel strands which are slidable along the directions of the axes of the first spline shafts and the second spline shafts, a lubricating unit is arranged on a front side of the strand threading units, and a bundling unit is arranged on a rear side of the strand threading units.

In the embodiment, the box girder includes a bottom plate, a top plate and webs on both sides of the box girder. Corrugated pipes are inserted inside the webs during pouring. In order to avoid the corrugated pipes from being blocked by slurry during pouring, plastic pipes need to be inserted and continuously pulled back and forth. After pouring is completed, steel strands need to be penetrated into the corrugated pipes for prestress tension.

When the plastic pipes need to be inserted in the top plate and the webs, the plastic pipes are inserted through the strand threading unit. The strand threading unit can also reciprocates the plastic pipes. When the steel strands need to be penetrated into the webs, the bundling unit can simply bundle the multiple steel strands and thread the multiple steel strands together. The lubricating unit can lubricate the steel strands to avoid sticking during penetration.

During strand threading construction of the box girders, the plastic pipes and the steel strands can be threaded in batches, and the steel strands are bundled when being threaded, so that the multiple steel strands can be threaded at one time, and the efficiency is improved. The steel strands and the plastic pipes can be lubricated to avoid being stuck when being threaded.

As shown in FIG. 5 to FIG. 8, each of the strand threading units includes a first box body 8, a top surface of the first box body 8 is open, second openings 9 are formed in left and right side walls of the first box body 8, bearings are installed at the second openings 9, multiple first rubber rollers 10 are rotatably installed between two bearings, the first spline shafts 4 pass respectively through the second openings 9 to stretch into the first box body 8, the first rubber rollers 10 respectively slidably sleeve the first spline shafts 4, first spline grooves 11 matched with the first spline shafts 4 are formed in the first rubber rollers 10, first ring grooves 12 are formed in circumferential outer walls of the first rubber rollers 10, and multiple first anti-skid stripes 13 are uniformly and fixedly connected into the first ring grooves 12 around the axes of the first spline shafts 4.

Front and rear sides of the top surface of the first box body 8 are fixedly connected with vertical plates 14, first sliding chutes 15 are formed in opposite sides of two vertical plates 14, a length direction of the first sliding chutes 15 is vertical to ground, a second box body 16 is slidably located in the first sliding chutes 15 and located above the first box body 8, a bottom surface of the second box body 16 is open, third openings 17 are formed in left and right side walls of the second box body 16, bearings are fixedly connected at the third openings 17, multiple second rubber rollers 18 are rotatably installed between two bearings, the second spline shafts 7 pass respectively through the third openings 17 to stretch into the second box body 16, the second rubber rollers 18 respectively slidably sleeve the second spline shafts 7, second spline grooves 19 matched with the second spline shafts 7 are formed in the second rubber rollers 18, second ring grooves 20 are formed in circumferential outer walls of the second rubber rollers 18, and multiple second anti-skid stripes 21 are uniformly and fixedly connected into the second ring grooves 20 around the axes of the second spline shafts 7.

A first avoidance groove 22 is formed in a front side wall of each of the strand threading boxes 3, a second avoidance groove 23 is formed in a rear side wall of each of the strand threading boxes 3, a feeding pipe 24 is fixedly connected to a rear side wall of the first box body 8, an end of the feeding pipe 24 is communicated into the first box body 8, an other end of the feeding pipe 24 extends out of the second avoidance groove 23, and is provided with the bundling unit, a discharging pipe 25 is fixedly connected to a front side wall of the first box body 8, an end of the discharging pipe 25 is communicated into the first box body 8, an other end of the discharging pipe 25 extends towards the first avoidance groove 22, and is provided with the lubricating unit.

In the embodiment, the first box body can slide left and right in the strand threading box to correspond the holes at different positions in the top plate and webs of the box girders, and the second box body can slide up and down to drive the second rubber roller to get close to or away from the first rubber roller to change the distance therebetween.

The first spline shaft rotates to drive the first rubber roller to rotate. The second spline shaft rotates to drive the second rubber roller to rotate. The plastic pipes or steel strands are inserted through the feeding pipe. The ring grooves on the first rubber roller and the second rubber roller clamps the plastic pipes or steel strands which need to be transported between the ring grooves, so that the plastic pipes or steel strands are convenient to transport and are sent out by the discharging pipe. The discharging pipes are aligned with the respective holes in the top plate and webs of the box girder. The bundling unit can bundle the multiple steel strands, and the lubricating unit can lubricate the steel strands to avoid sticking when the steel strands are threaded.

The steel strands do not need to be drawn after being threaded. When the plastic pipes need to be drawn, the first spline shaft and the second spline shaft are reversed to drive the first rubber roller and the second rubber roller to reverse, so that the plastic pipes can be drawn out.

Figure 6:
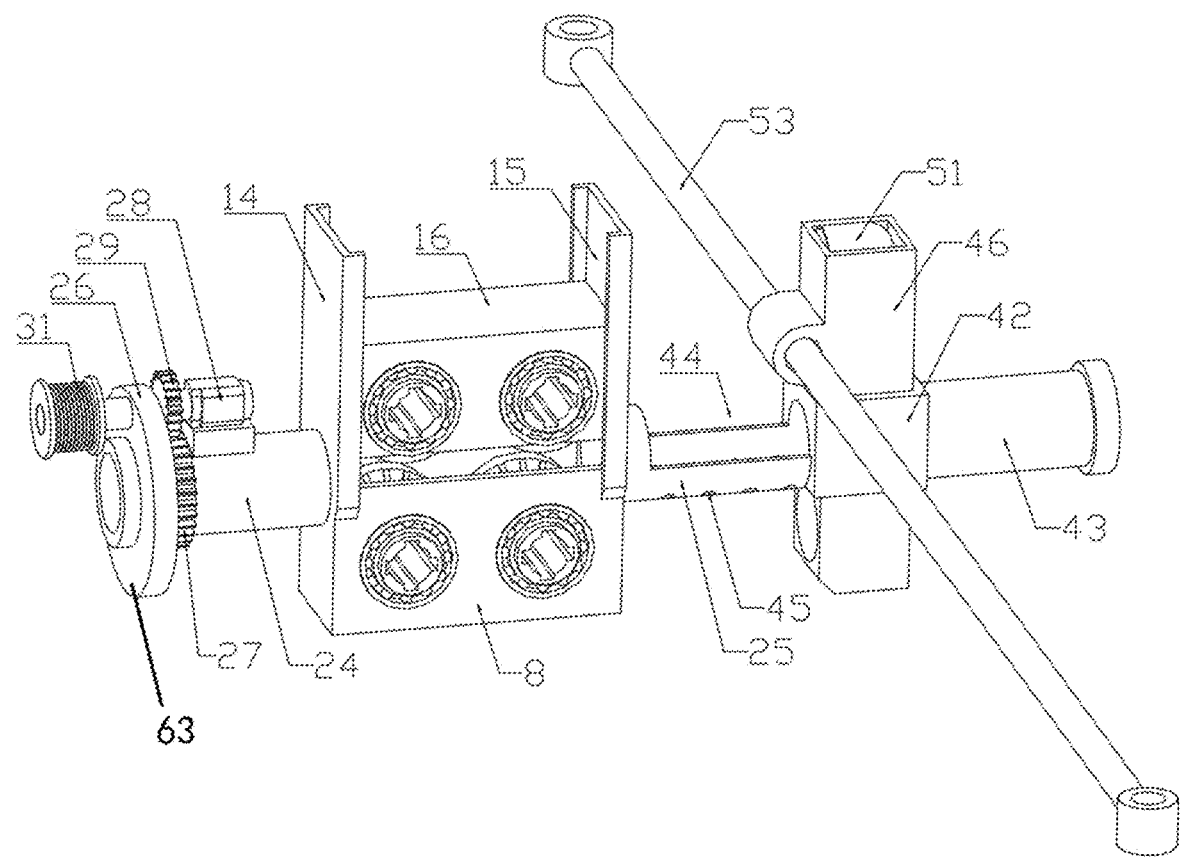
FIG. 6 is a schematic diagram of a strand threading unit in the present disclosure.

As shown in FIG. 6, the bundling unit includes a first disc 26, the first disc 26 rotatably sleeves a circumferential outer wall of an end of the feeding pipe 24, the first disc 26 is coaxial with the feeding pipe 24; an end face, facing the strand threading boxes 3, of the first disc 26 is fixedly connected with a first gear ring 27, the first gear ring 27 is coaxial with the first disc 26, a first motor 28 is installed on a circumferential outer wall of the feeding pipe 24, an output shaft of the first motor 28 is fixedly connected with a first gear 29, and the first gear 29 is meshed with the first gear ring 27.

An end face, away from the strand threading boxes 3, of the first disc 26 is fixedly connected with a wire roller 31, the wire roller 31 is located at an eccentric position of the first disc 26, and an axis of the wire roller 31 is parallel to an axis of the first disc 26.

In the embodiment, one plastic pipe is usually arranged, and does not need to be bundled. The multiple steel strands are arranged. In order to improve the threading efficiency, the steel strands are simultaneously put into the feeding pipe.

Firstly, a worker pulls out one end of a steel wire on the wire roller to tie to the steel strands. The first and second rubber rollers are started, and the steel strands are transported forward. The first motor is started to drive the first disc to rotate. The first disc drives the wire roller to rotate around the steel strands, and the steel wire on the wire roller is bound to the steel strands during the transportation of the steel strands, so that the multiple steel strands are bound together for easy transportation. After the transportation is completed, the worker cuts the steel wire short.

By adjusting the transportation speed of the rubber roller and the rotating speed of the first disc, the bundling tightness of steel wire is changed, the steel wire is necessarily avoided from being wound too tightly to prevent from affecting the subsequent prestress tension of the steel strands.

As shown in FIG. 2 to FIG. 5, a top surface of an uppermost one of the strand threading boxes 3 is fixedly connected with a top oil tank 32, a bottom surface of a lowermost one of the strand threading boxes 3 is fixedly connected with a recovery tank 33, the top oil tank 32 communicates with the recovery tank 33 through an oil pipe 34, a pump body 35 is installed on the oil pipe 34, and water leakage holes communicating with adjacent strand threading boxes 3 are formed in a bottom surface of the top oil tank 32 and a top surface of the recovery tank 33.

A second sliding chute 36 is formed in an inner bottom surface of each of the strand threading boxes 3, the second sliding chute 36 is located below the discharging pipe 25, a sliding direction of the second sliding chute 36 is parallel to a shaft axis of the discharging pipe 25, first water leakage holes 37 communicating with a lower one of the strand threading boxes 3 are formed in a bottom surface of the second sliding chute 36, a first sliding plate 38 which is able to block the first water leakage holes 37 is slidably arranged in the second sliding chute 36, second water leakage holes 39 matched with the first water leakage holes 37 are formed in the first sliding plate 38, a spring 40 is installed in the second sliding chute 36, one end of the spring 40 is fixedly connected with a rear side wall of the second sliding chute 36, an other end of the spring 40 is fixedly connected with a rear side wall of the first sliding plate 38, and a guide inclined plane 41 is arranged in a front side of the first sliding plate 38.

In the embodiment, in a conventional state, lubricating oil drips from the water leakage holes in turn and is finally collected into the recovery box located on the lowest layer. When the steel strands need to be lubricated, the pump body pumps up the lubricating oil and sends the lubricating oil into the top oil tank. The top oil tank cannot store the lubricating oil, and the lubricating oil drips into the strand threading box below from the water leakage holes of the top oil tank.

The lubricating oil drips from the upper strand threading box through the first water leakage holes to the lower strand threading box. In the initial state, the spring pushes the first sliding plate. So that the second water leakage holes are not aligned with the first water leakage holes, and the lubricating oil does not continue to drip to the lower layer. Only when the guide inclined plane is pushed, the first sliding plate slides, and the spring is compressed, the second water leakage holes are aligned with the first water leakage holes, and the lubricating oil continues to drip to the lower layer.

Figure 7:
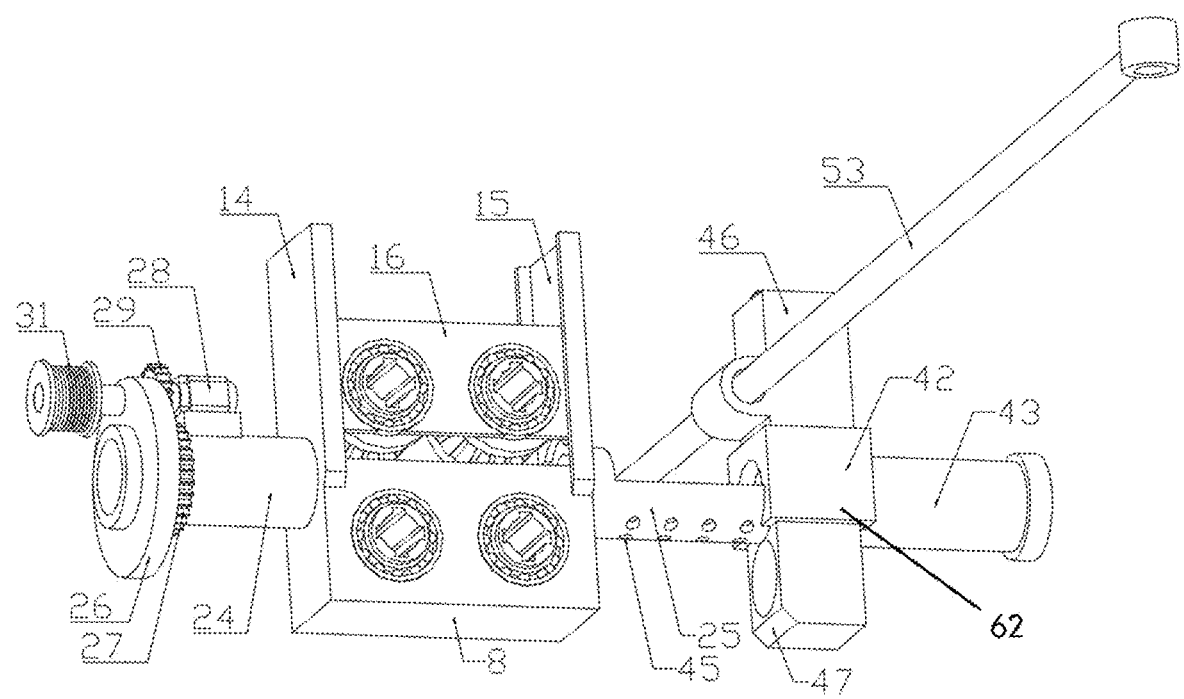
FIG. 7 is a schematic diagram of a bundling unit in the present disclosure.
Figure 8:
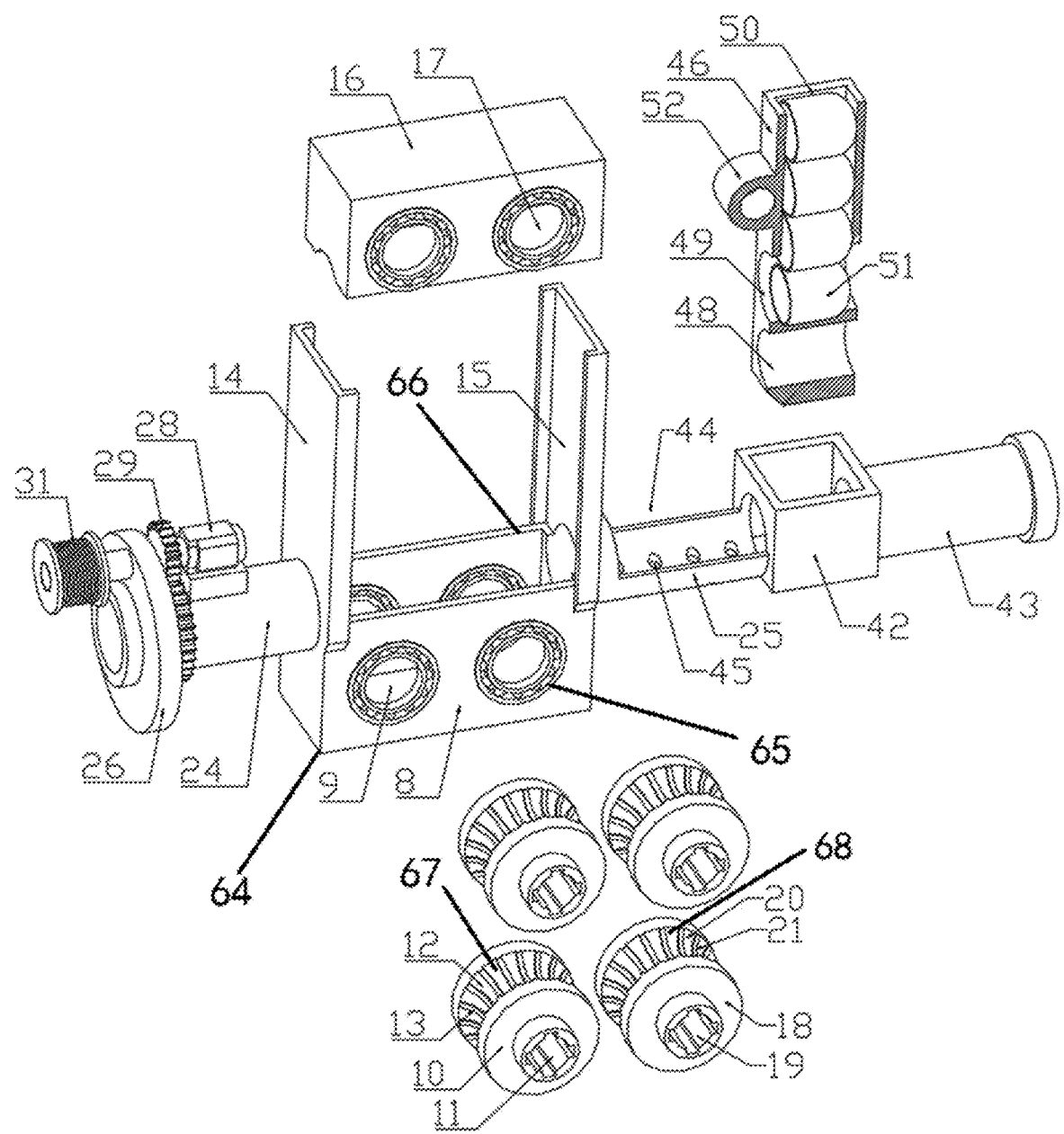
FIG. 8 is a schematic diagram of a lubricating unit in the present disclosure.

As shown in FIG. 7 and FIG. 8, the lubricating unit includes a first square frame 42, the first square frame 42 is located above the second sliding chute 36, an opening direction of the first square frame 42 is vertical to a bottom surface of the strand threading boxes 3, the first square frame 42 is fixedly connected to a front end of the discharging pipe 25; one end, facing the discharging pipe 25, of the first square frame 42 communicates with the discharging pipe 25, and an other end, facing the first avoidance groove 22, of the first square frame 42 is fixedly connected with an end of a second pipeline 43; an other end of the second pipeline 43 extends out of the first avoidance groove 22, a notch 44 is formed on a circumferential outer wall, facing a top surface of the strand threading boxes 3, of the discharging pipe 25, and third water leakage holes 45 are formed on a circumferential outer wall, facing a bottom surface of the strand threading boxes 3, of the discharging pipe 25.

A first square column 46 is arranged in the first square frame 42 in an up and down slidable manner, a driving inclined plane 47 matched with the guide inclined plane 41 is arranged on a rear side wall of the first square column 46, a first channel 48 and a second channel 49 are sequentially formed between a front side wall and the rear side wall of the first square column 46 from bottom to top, the first channel 48 and the second channel 49 are both parallel to the axis of the discharging pipe 25 and are able to communicate with the discharging pipe 25 and the second pipeline 43; a storage tank 50 is formed in a top portion of the first square column 46, multiple rub caps 51 are stacked in the storage tank 50, a bottom of the storage tank 50 communicates with the second channel 49, the rear side wall of the first square column 46 is also fixedly connected with a lifting block 52, the lifting block 52 slidably sleeves a first cross rod 53, an axis of the first cross rod 53 is perpendicular to the left and right side walls of the strand threading boxes 3, and both ends of the first cross rod 53 extend respectively out of the left and right side walls of the strand threading boxes 3.

In the embodiment, the first square column can be located at an upper working position or a lower working position by lifting the cross rod. When the first square column is located at the upper position, the first channel communicates with the discharging pipe and the second pipeline, which are arranged at both ends of the first channel, respectively. The plastic pipe is sent out through the discharging pipe, the first channel and the second pipeline.

When the first square column is located at the lower position, the second channel communicates with the discharging pipe and the second pipeline, which are arranged at both ends of the second channel, respectively. The steel strands are sent out through the discharging pipe, the second channel and the second pipeline. At the same time, the driving inclined plane contacts the guiding inclined plane of the first sliding plate to push the first sliding plate away. So that the second water leakage holes are aligned with the first water leakage holes, and the lubricating oil drips to the lower layer, drops on the notch on the discharging pipe, drops on the steel strands, and then drops into the second sliding chute through the third water leakage holes in the discharging pipe and drops to the lower layer through the first water leakage holes in the second sliding chute.

Multiple rubber caps are stored in the storage tank. An open end of the rubber cap faces towards the discharging pipe. The lowest rubber cap falls into the second channel. When the steel strands are transported, a bundle of steel strands enters the second channel, an end of the bundle of steel strands is inserted into the rubber cap, so that the rubber cap sleeve the end of the bundle of steel strands, the bundle of steel strands is continuously transported forward against the rubber cap, and the rubber cap can prevent the end of the bundle of steel strands from cutting the corrugated pipe during transportation.

As shown in FIG. 1 and FIG. 2, a first threaded rod 54 and a first sliding rod 55 are rotatably installed on the underframe 1, axes of the first threaded rod 54 and the first sliding rod 55 are vertical to the ground, the first threaded rod 54 and the first sliding rod 55 are respectively located on the left and right sides of the strand threading boxes 3, one end of the first cross rod 53 sleeves the first sliding rod 55, an other end of the first cross rod 53 sleeves the first threaded rod 54 and is in threaded connection with the first threaded rod 54, and a second motor 56 for driving the first threaded rod 54 to rotate is also installed on the underframe 1.

In the embodiment, the second motor rotates to drive the first threaded rod, the first threaded rod cooperates with the first sliding rod to drive the first cross rod to lift, and the first cross rod drives the multiple first square columns to lift.

Figure 3:
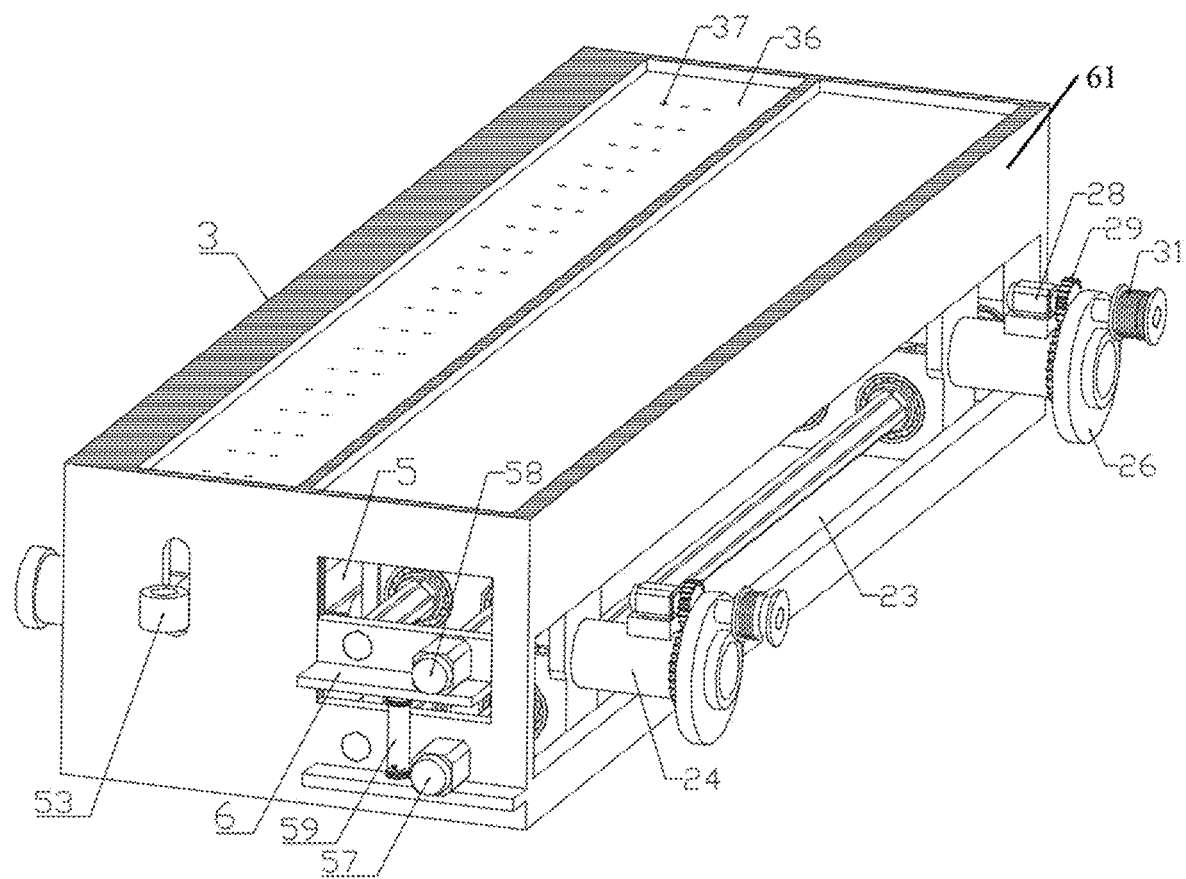
FIG. 3 is a first schematic diagram of a strand threading box in the present disclosure.
Figure 4:
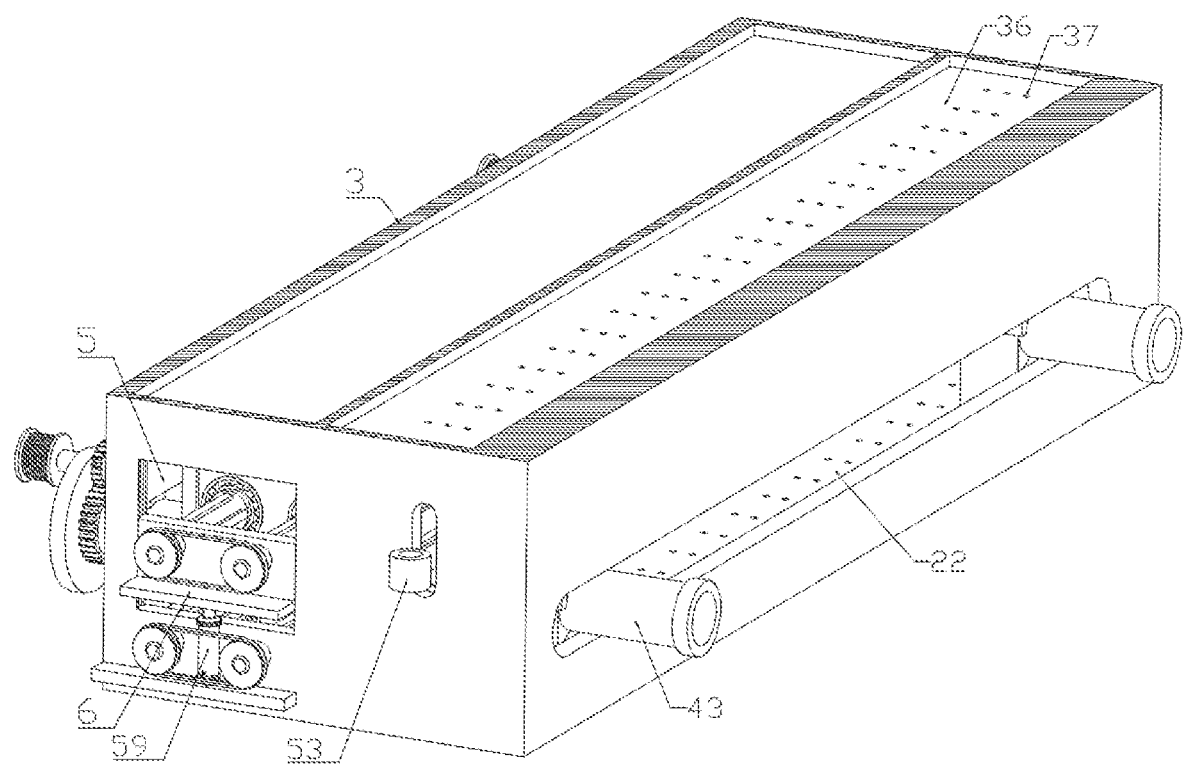
FIG. 4 is a second schematic diagram of a strand threading box in the present disclosure.

As shown in FIG. 3 and FIG. 4, a third motor 57 is installed on an outer side wall of each of the strand threading boxes 3, an output shaft of the third motor 57 extends into the strand threading box 3 and is fixedly connected with one of the first spline shafts 4, and belts are arranged between the other first spline shafts 4 to drive the other first spline shafts.

A fourth motor 58 is installed on each of the first sliding blocks 6, an output shaft of the fourth motor 58 extends into the strand threading box 3 and is fixedly connected with one of the second spline shafts 7, belts are arranged between the other second spline shafts 7 to drive the other second spline shafts, an electric telescopic rod 59 is also installed on the outer side wall of the strand threading box 3, a telescopic end of the electric telescopic rod 59 is vertical to the ground and fixedly connected with the first sliding blocks 6.

In the embodiment, the third motor drives the first spline shaft to rotate. The first spline shaft drives the first rubber roller. The fourth motor drives the second spline shaft. The second spline shaft drives the second rubber roller. Therefore the steel strands are transported. The electric telescopic rod drives the second spline shaft to lift and then drives the second box body to lift and change the distance between the first rubber roller and the second rubber roller.

As shown in FIG. 1, the underframe 1 is formed by welding multiple steel angles.

Finally, it should be noted that the above-mentioned embodiments are only used for illustrating the technical solutions of the present disclosure but not restricting the scope of protection of the present disclosure. Although the present disclosure is described in detail by reference to the above-mentioned embodiment, those ordinary skilled in the art should understand that the technical solutions of the present disclosure can be amended or equally substituted without departing from the spirits and scope of the present disclosure and should be contained in the scope of claims of protected the present disclosure.

What is claimed is:

1. An adjustable strand threading and lubricating device for prefabricated box girders, comprising an underframe (1), wherein wheels (2) are installed on the underframe (1), a plurality of strand threading boxes (3) are fixedly connected on a top surface of the underframe (1) from bottom to top in a sequentially stacked manner, a feeding side of the strand threading boxes (3) is a rear side, a discharging side of the strand threading boxes (3) is a front side, a plurality of first spline shafts (4) are rotatably installed between left and right side walls of the strand threading boxes (3), axes of the first spline shafts (4) are vertical to the left and right side walls of the strand threading boxes (3), first openings (5) are formed in the left and right side walls of the strand threading boxes (3), the first openings (5) are respectively located above the first spline shafts (4), first sliding blocks (6) are respectively provided and configured to slide up and down in the first openings (5), a plurality of second spline shafts (7) are rotatably installed between two first sliding blocks (6), and axes of the second spline shafts (7) are parallel to the first spline shafts (4); and the first spline shafts (4) and the second spline shafts (7) are provided with a plurality of strand threading units for threading steel strands which are slidable along the directions of the axes of the first spline shafts and the second spline shafts, a lubricating unit is arranged on a front side of the strand threading units, and a bundling unit is arranged on a rear side of the strand threading units;

wherein each of the strand threading units comprises a first box body (8), a top surface of the first box body (8) is open, second openings (9) are formed in left and right side walls of the first box body (8), bearings are installed at the second openings (9), a plurality of first rubber rollers (10) are rotatably installed between two bearings, the first spline shafts (4) pass respectively through the second openings (9) to stretch into the first box body (8), the first rubber rollers (10) respectively slidably sleeve the first spline shafts (4), first spline grooves (11) matched with the first spline shafts (4) are formed in the first rubber rollers (10), first ring grooves (12) are formed in circumferential outer walls of the first rubber rollers (10), and a plurality of first anti-skid stripes (13) are uniformly and fixedly connected into the first ring grooves (12) around the axes of the first spline shafts (4);

front and rear sides of the top surface of the first box body (8) are fixedly connected with vertical plates (14), first sliding chutes (15) are formed in opposite sides of two vertical plates (14), a length direction of the first sliding chutes (15) is vertical to ground, a second box body (16) is slidably located in the first sliding chutes (15) and located above the first box body (8), a bottom surface of the second box body (16) is open, third openings (17) are formed in left and right side walls of the second box body (16), bearings are fixedly connected at the third openings (17), a plurality of second rubber rollers (18) are rotatably installed between two bearings, the second spline shafts (7) pass respectively through the third openings (17) to stretch into the second box body (16), the second rubber rollers (18) respectively slidably sleeve the second spline shafts (7), second spline grooves (19) matched with the second spline shafts (7) are formed in the second rubber rollers (18), second ring grooves (20) are formed in circumferential outer walls of the second rubber rollers (18), and a plurality of second anti-skid stripes (21) are uniformly and fixedly connected into the second ring grooves (20) around the axes of the second spline shafts (7);

a first avoidance groove (22) is formed in a front side wall of each of the strand threading boxes (3), a second avoidance groove (23) is formed in a rear side wall of each of the strand threading boxes (3), a feeding pipe (24) is fixedly connected to a rear side wall of the first box body (8), an end of the feeding pipe (24) is communicated into the first box body (8), an other end of the feeding pipe (24) extends out of the second avoidance groove (23), and is provided with the bundling unit, a discharging pipe (25) is fixedly connected to a front side wall of the first box body (8), an end of the discharging pipe (25) is communicated into the first box body (8), an other end of the discharging pipe (25) extends towards the first avoidance groove (22), and is provided with the lubricating unit.

2. The adjustable strand threading and lubricating device for prefabricated box girders according to claim 1, wherein the bundling unit comprises a first disc (26), the first disc (26) rotatably sleeves a circumferential outer wall of an end of the feeding pipe (24), the first disc (26) is coaxial with the feeding pipe (24); an end face, facing the strand threading boxes (3), of the first disc (26) is fixedly connected with a first gear ring (27), the first gear ring (27) is coaxial with the first disc (26), a first motor (28) is installed on a circumferential outer wall of the feeding pipe (24), an output shaft of the first motor (28) is fixedly connected with a first gear (29), and the first gear (29) is meshed with the first gear ring (27); and an end face, away from the strand threading boxes (3), of the first disc (26) is fixedly connected with a wire roller (31), the wire roller (31) is located at an eccentric position of the first disc (26), and an axis of the wire roller (31) is parallel to an axis of the first disc (26).

3. The adjustable strand threading and lubricating device for prefabricated box girders according to claim 1, wherein a top surface of an uppermost one of the strand threading boxes (3) is fixedly connected with a top oil tank (32), a bottom surface of a lowermost one of the strand threading boxes (3) is fixedly connected with a recovery tank (33), the top oil tank (32) communicates with the recovery tank (33) through an oil pipe (34), a pump body (35) is installed on the oil pipe (34), and water leakage holes communicating with adjacent strand threading boxes (3) are formed in a bottom surface of the top oil tank (32) and a top surface of the recovery tank (33); and a second sliding chute (36) is formed in an inner bottom surface of each of the strand threading boxes (3), the second sliding chute (36) is located below the discharging pipe (25), a sliding direction of the second sliding chute (36) is parallel to a shaft axis of the discharging pipe (25), first water leakage holes (37) communicating with a lower one of the strand threading boxes (3) are formed in a bottom surface of the second sliding chute (36), a first sliding plate (38) which is able to block the first water leakage holes (37) is slidably arranged in the second sliding chute (36), second water leakage holes (39) matched with the first water leakage holes (37) are formed in the first sliding plate (38), a spring (40) is installed in the second sliding chute (36), one end of the spring (40) is fixedly connected with a rear side wall of the second sliding chute (36), an other end of the spring (40) is fixedly connected with a rear side wall of the first sliding plate (38), and a guide inclined plane (41) is arranged in a front side of the first sliding plate (38).

4. The adjustable strand threading and lubricating device for prefabricated box girders according to claim 3, wherein the lubricating unit comprises a first square frame (42), the first square frame (42) is located above the second sliding chute (36), an opening direction of the first square frame (42) is vertical to a bottom surface of the strand threading boxes (3), the first square frame (42) is fixedly connected to a front end of the discharging pipe (25); one end, facing the discharging pipe (25), of the first square frame (42) communicates with the discharging pipe (25), and an other end, facing the first avoidance groove (22), of the first square frame (42) is fixedly connected with an end of a second pipeline (43); an other end of the second pipeline (43) extends out of the first avoidance groove (22), a notch (44) is formed on a circumferential outer wall, facing a top surface of the strand threading boxes (3), of the discharging pipe (25), and third water leakage holes (45) are formed on a circumferential outer wall, facing a bottom surface of the strand threading boxes (3), of the discharging pipe (25);

a first square column (46) is arranged in the first square frame (42) in an up and down slidable manner, a driving inclined plane (47) matched with the guide inclined plane (41) is arranged on a rear side wall of the first square column (46), a first channel (48) and a second channel (49) are sequentially formed between a front side wall and the rear side wall of the first square column (46) from bottom to top, the first channel (48) and the second channel (49) are both parallel to the axis of the discharging pipe (25) and are able to communicate with the discharging pipe (25) and the second pipeline (43); a storage tank (50) is formed in a top portion of the first square column (46), a plurality of rub caps (51) are stacked in the storage tank (50), a bottom of the storage tank (50) communicates with the second channel (49), the rear side wall of the first square column (46) is also fixedly connected with a lifting block (52), the lifting block (52) slidably sleeves a first cross rod (53), an axis of the first cross rod (53) is perpendicular to the left and right side walls of the strand threading boxes (3), and both ends of the first cross rod (53) extend respectively out of the left and right side walls of the strand threading boxes (3).

5. The adjustable strand threading and lubricating device for prefabricated box girders according to claim 4, wherein a first threaded rod (54) and a first sliding rod (55) are rotatably installed on the underframe (1), axes of the first threaded rod (54) and the first sliding rod (55) are vertical to the ground, the first threaded rod (54) and the first sliding rod (55) are respectively located on the left and right sides of the strand threading boxes (3), one end of the first cross rod (53) sleeves the first sliding rod (55), an other end of the first cross rod (53) sleeves the first threaded rod (54) and is in threaded connection with the first threaded rod (54), and a second motor (56) for driving the first threaded rod (54) to rotate is also installed on the underframe (1).

6. The adjustable strand threading and lubricating device for prefabricated box girders according to claim 1, wherein a third motor (57) is installed on an outer side wall of each of the strand threading boxes (3), an output shaft of the third motor (57) extends into the strand threading box (3) and is fixedly connected with one of the first spline shafts (4), and belts are arranged between the other first spline shafts (4) to drive the other first spline shafts; and a fourth motor (58) is installed on each of the first sliding blocks (6), an output shaft of the fourth motor (58) extends into the strand threading box (3) and is fixedly connected with one of the second spline shafts (7), belts are arranged between the other second spline shafts (7) to drive the other second spline shafts, an electric telescopic rod (59) is also installed on the outer side wall of the strand threading box (3), a telescopic end of the electric telescopic rod (59) is vertical to the ground and fixedly connected with the first sliding blocks (6).

7. The adjustable strand threading and lubricating device for prefabricated box girders according to claim 1, wherein the underframe (1) is formed by welding a plurality of steel angles.

* * * * *